Dec. 3, 1940. P. T. GRIFFIN Re. 21,644

EVACUANT RECEPTACLE

Original Filed Jan. 11, 1937

Inventor
Pauline T. Griffin,

By A. Yates Dowell
Attorney

Reissued Dec. 3, 1940

Re. 21,644

UNITED STATES PATENT OFFICE 21,644

EVACUANT RECEPTACLE

Pauline T. Griffin, Kinston, N. C.

Original No. 2,126,631, dated August 9, 1938, Serial No. 120,100, January 11, 1937. Application for reissue June 8, 1939, Serial No. 278,165

5 Claims. (Cl. 128—275)

This invention relates to a receptacle in the nature of a drain pan particularly adapted for use in hospitals in relieving gas pains after an operation and at the same time catch any leakage or secretions that might drain from a patient.

The primary object of the invention is to provide a device for the above purpose which will ensure against soiling of patients' linen and bedding and unsanitary conditions in general, and which will also ensure against a patient being subjected to the uncomfortable and oft-times deleterious effects resulting from contact with excreta and secretions unavoidably given off by the patient. Another important object is to render the functions of a nurse more pleasant and sanitary as well as economize in the cost of laundering soiled linen and bed clothes.

Further and more specific objects are, to provide a receptacle of the type specified which is completely enclosed and is so constructed as to prevent leakage should the receptacle be turned over or upset; to provide a receptacle of this type which may be readily kept clean and sanitary and which will be formed of a few strong, simple and durable parts, inexpensive of manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification—

Figure 1:
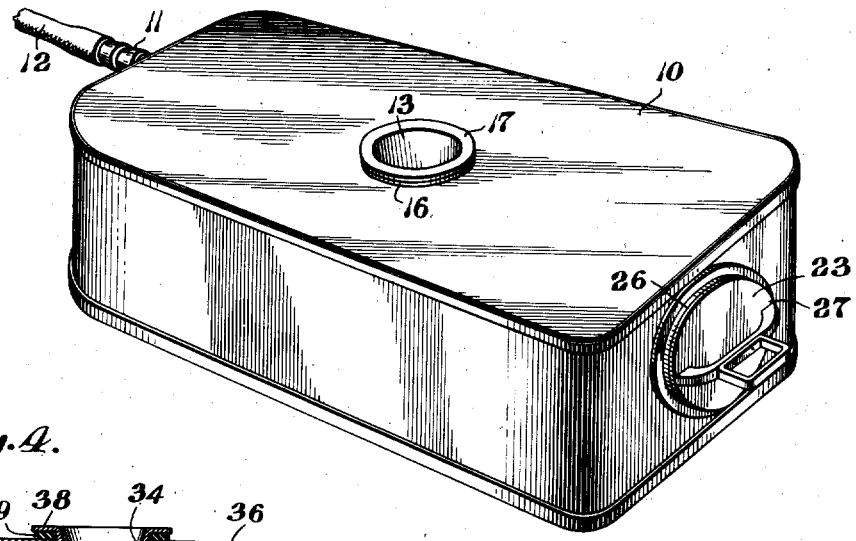
Fig. 1 is a perspective view of an evacuant receptacle constructed in accordance with the invention.

Referring now to the drawing in which like characters of reference designate similar parts in the various views, 10 designates a substantially flat completely enclosed receptacle which may be formed of any suitable material and preferably is provided with a bottom of thicker gauge material than the walls and the top of the receptacle so that the receptacle will not easily be overturned when positioned in the bed between the sheets or held between the patient's legs.

It is desirable that the receptacle have a shape conducive to comfort and convenience. Accordingly, it is preferably oblong in general contour tapering toward one end and which may be termed the receiving end, so that it may be readily disposed between the lower limbs of a patient.

A hose connection 11 is secured in one end wall of the receptacle to receive a rubber hose 12 which may be inserted in a wound to drain the wound or may be inserted in the rectum to relieve gas pains after an operation and this latter use will perhaps be the most frequent use to be made of the receptacle in hospitals and other places. The hose 12 may be of any length and may even be of such length that the receptacle may be set upon the floor adjacent to the bed in lieu of being placed upon the bed itself.

The receptacle is provided with a valve-controlled gas vent or port at the lower end of a downwardly-projecting valve housing in the form of a funnel 13, the latter having a threaded boss 14 in screw-threaded engagement with an internally threaded ring 15 integral with the top of the receptacle. A gasket 16 is interposed between the top of the receptacle and a flange 17 on the funnel to form a liquid-tight connection with the receptacle.

A ball valve 18 controls the opening at the bottom of the funnel. The valve is provided with a stem 19 which is slidably fitted in a ring bearing 20 having radially disposed arms 21 that are terminally secured to the inner surface of the funnel. The stem terminates in a disc 22 which engages the bearing 20 and limits opening movement of the valve. The valve is normally open so that gas from a patient may escape through the funnel without obstruction. Should the receptacle overturn, however, the ball valve will automatically close and seal the funnel so that none of the liquid contents of the receptacle which may drain from the patient simultaneously with the expulsion of the gas, can escape and soil adjacent articles.

A plug 23 is provided with an exteriorly threaded flange 24 which screw threadedly engages an interiorly screw threaded ring 25 forming an outlet opening in the end wall of the receptacle opposite the hose connection 11. A gasket 26 is compressed against the end of the receptacle by a flange 27 on the plug to maintain a liquid tight joint when the plug is screwed in. Removal of the plug permits the receptacle to be cleansed by connecting a water hose to the connection 11 and directing a stream of water through the receptacle and through the outlet opening defined by the ring 25.

Due to the fact that the valve housing or funnel projects downwardly a certain distance into the receptacle, thus bringing the gas relief vent or port below the top of the receptacle, there will be no leakage from the receptacle should the latter tilt or be rocked and not upset.

Figure 2:
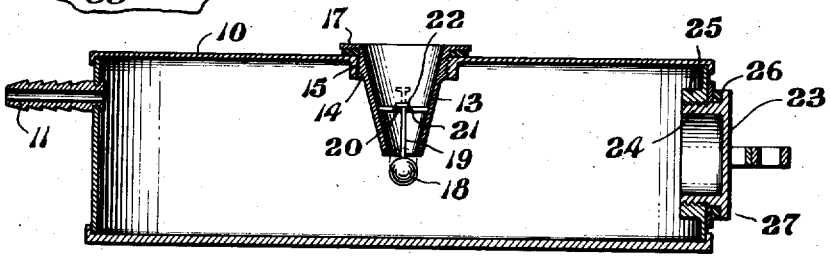
Fig. 2 is a longitudinal sectional view of the receptacle shown in Fig. 1.
Figure 3:
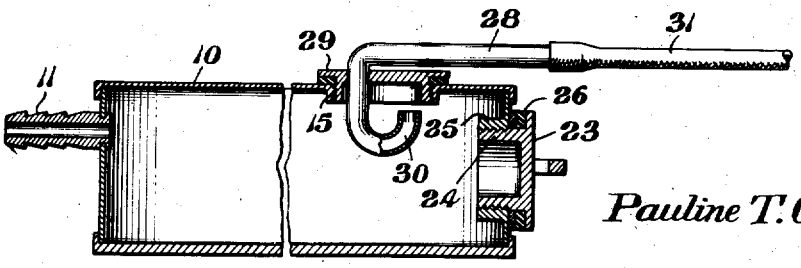
Fig. 3 is a longitudinal sectional view of a modified form of the invention showing the receptacle equipped with an overflow pipe which may be substituted for the valve controlled funnel ordinarily in use in connection with the pan; and, Fig. 4 is a detail longitudinal sectional view of a modified form of the invention.

In lieu of the funnel 13 the receptacle may be equipped with an overflow connection the same comprising a pipe 28 which extends downwardly through a flanged cap 29 which is screwed into the interiorly threaded funnel securing ring 15. The lower end of the pipe is curved back upon itself toward the cap as shown at 30 so that when the receptacle becomes full the overflow will escape through the pipe 28 and through a hose 31 connected thereto to any suitable catch basin. The construction of the receptacle and the hose connection and the plug closure of the outlet opening, in Fig. 3, are identical with the similar parts illustrated, in Fig. 2, so that the same reference numerals have been applied.

Figure 4:
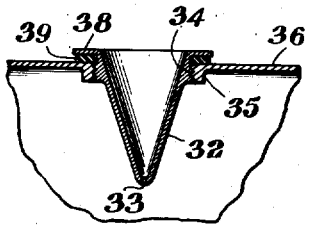

In the modified form of the invention shown in Fig. 4 the check valve is dispensed with and the funnel is substantially conical. A gas escape opening 33 of small diameter is provided in the tip of the funnel. As heretofore described the funnel is provided with a threaded boss 34 which has screw threaded engagement with an internally threaded ring 35 formed integral with the top of the plate 36. A gasket 39 is interposed between the top of the pan and a flange 38 on the funnel to form a liquid tight connection between the funnel and the receptacle.

Since the operation of the device has been described as the description of the parts progressed, it is thought that the construction and operation of the invention will be fully understood without further explanation.

What is claimed is:

1. A drain pan comprising a substantially flat completely enclosed pan formed with a bottom of thicker gauge material than the walls and the top of the pan so as not to be easily overturned, a hose connection secured in one end wall of the pan, a funnel provided with an externally threaded boss, an internally threaded ring integral with the top of the pan, said boss being screw threadedly engaged with said ring, a flange formed on the top of the funnel, a gasket interposed between the top of the pan and the flange to form a liquid-tight connection with the pan, a ring bearing in the funnel having radially disposed arms terminally secured to the inner surface of the funnel, the bottom of the funnel being disposed approximately at the center of the pan and having an opening of small diameter therein, a ball valve in said opening, a stem for the valve slidably fitted in said bearing, and a disc on said stem engageable with said bearing to limit opening movement of the valve.

2. An evacuant receptacle having a substantially flat bottom which is relatively heavy with respect to the remainder of the receptacle so as not to be easily overturned, side and end walls and a top wall completely closing the receptacle, a hose connection in one of said end walls for conducting gas and liquid excretions from a patient into the receptacle, the top wall of the receptacle having a downwardly projecting valve housing provided with a vent permitting gas to escape from the receptacle, a valve member carried by said housing, means normally supporting said valve member clear of said vent to permit gases to escape from the receptacle, said valve member being constructed and arranged to move to vent-closing position should the receptacle become accidentally upset, and means rendering the interior of the receptacle accessible for flushing purposes.

3. An accessory for attachment to an opening in the body of an immobilized person comprising a substantially closed receptacle adapted to be rested on a support near said person, means to connect the receptacle to said opening for conducting gas and liquid excretions solely by a gravity flow into the receptacle and at the same time allow limited bodily movements of the person in respect to the receptacle, vent means permitting gas to escape from the receptacle, and a valve member coacting with said vent means and arranged to maintain said vent means normally open but to automatically close it in the event the receptacle is overturned.

4. An accessory for attachment to an opening in the body of an immobilized person comprising a substantially closed receptacle adapted to be rested on a support near said person, for example a bed, said receptacle including top, side and bottom walls of which the bottom wall is heaviest thus tending to maintain the receptacle upright and against upsetting in said bed, means to connect the receptacle to said opening, said means being flexible in nature thus to allow limited bodily movement of the person in respect to the receptacle and thus interpose a safety factor between said permissible bodily movement and the possibility of upsetting the receptacle, vent means depending from the top wall, extending inwardly of the receptacle and having an orifice confronting the bottom wall, and a valve member operable from the inside of the receptacle against said orifice, said valve member having suspension means hanging from the inside of the vent means through the orifice to a place of connection with said valve member.

5. An accessory comprising a substantially closed receptacle for use in trapping body secretions and in consequence requiring periodic flushing, said receptacle including a top and bottom and a connecting wall having two confronting end wall portions each with an opening, vent means depending from the top into the receptacle for the escape of gas therefrom, valve means working in conjunction with said vent means to allow said escape of gas as aforesaid in a normally upright position of the receptacle but closing by gravity upon upsetting the receptacle thereby to retain entrapped liquid matter, said vent and valve means being in line with said openings, a plug normally closing one of the openings but being removable therefrom prior to a flushing operation, and means at the other opening for the introduction of a flushing stream, which when directed toward the other opening washes off matter adhering to the vent and valve means.

PAULINE T. GRIFFIN.